Jan. 3, 1939.  W. G. WEHR  2,142,579
CRANE SCALE
Filed June 8, 1935   7 Sheets-Sheet 1

FIG. 1

INVENTOR.
WILLIAM G. WEHR
Kwis, Hudson & Kent
ATTORNEYS

Jan. 3, 1939.   W. G. WEHR   2,142,579
CRANE SCALE
Filed June 8, 1935   7 Sheets-Sheet 2

FIG. 2

INVENTOR.
WILLIAM G. WEHR
ATTORNEYS

INVENTOR.
WILLIAM G. WEHR
BY
Kwis, Hudson & Kent
ATTORNEYS.

Patented Jan. 3, 1939

2,142,579

UNITED STATES PATENT OFFICE 2,142,579

CRANE SCALE

William G. Wehr, Wickliffe, Ohio, assignor to The Cleveland Crane & Engineering Company, Wickliffe, Ohio, a corporation of Ohio Application June 8, 1935, Serial No. 25,575

4 Claims. (Cl. 212—2)

The present invention relates to overhead cranes, especially traveling cranes, and more particularly to overhead traveling cranes including means for weighing or determining the weight of the load lifted or carried by the crane while the same is supported thereby.

An object of the present invention is the provision of a novel weighing instrument comprising means for indicating and/or recording the weight of a load supported thereby in which the indicating and/or recording device is located at a point remote from the weighing mechanism proper and connected therewith by electrically controlled means.

Another object of the present invention is the provision of a novel trolley for a crane including means for weighing a load supported or carried thereby.

Another object of the present invention is the provision of a novel crane comprising means for weighing a load while supported thereby and indicating and/or recording the weight thereof at a remote point.

Another object of the present invention is the provision of a novel crane comprising a trolley adapted to weigh a load while supported thereby and means for indicating and/or recording the weight of the load at a point remote from the trolley.

Another object of the present invention is the provision of a novel crane of the traveling type comprising a trolley adapted to weigh a load while supported or carried thereby and means in the cage for indicating and/or recording the weight of the load.

The present invention resides in certain novel features and details of construction, and combinations and arrangements of parts, and further objects and advantages thereof will be apparent to those skilled in the art to which it pertains from the following description of the preferred embodiment thereof described with reference to the accompanying drawings, in which.

Similar reference characters designate corresponding parts throughout the several views of the drawings.

Figure 1:
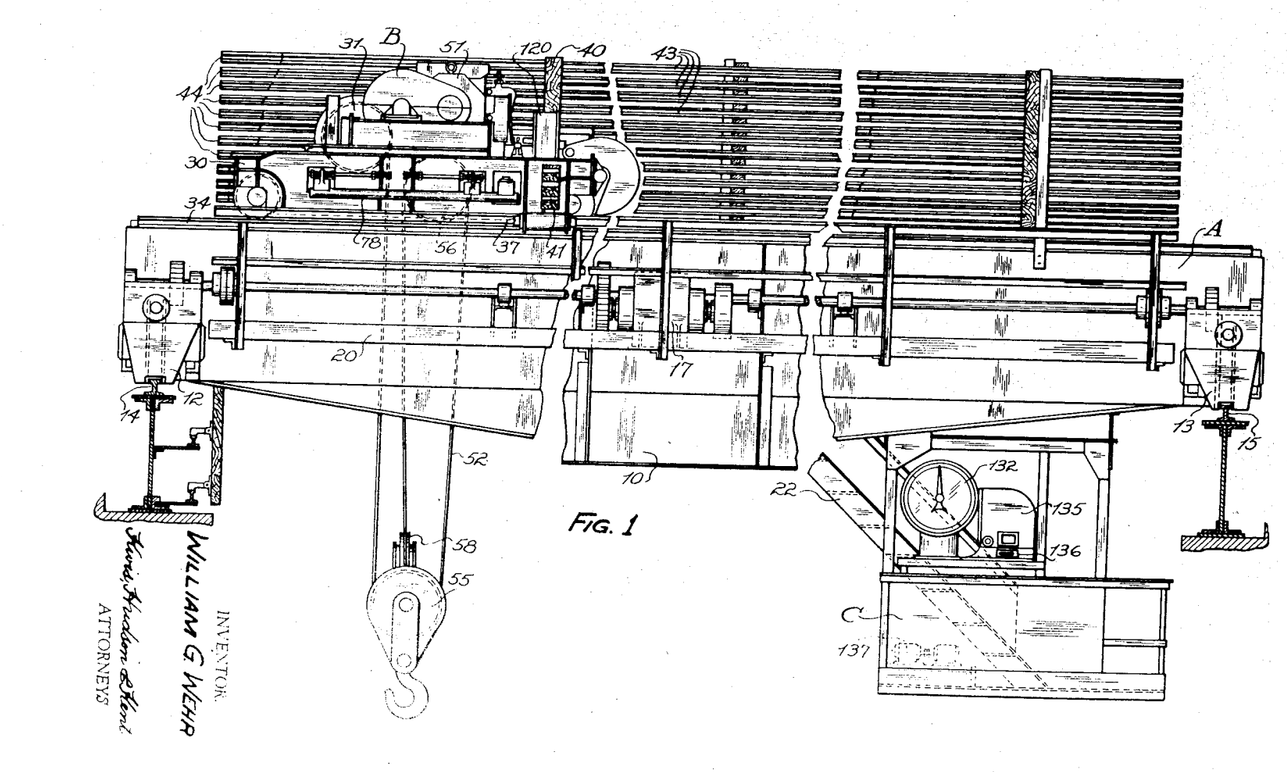
Fig. 1 is a side elevation of a traveling crane embodying the present invention.
Figure 2:
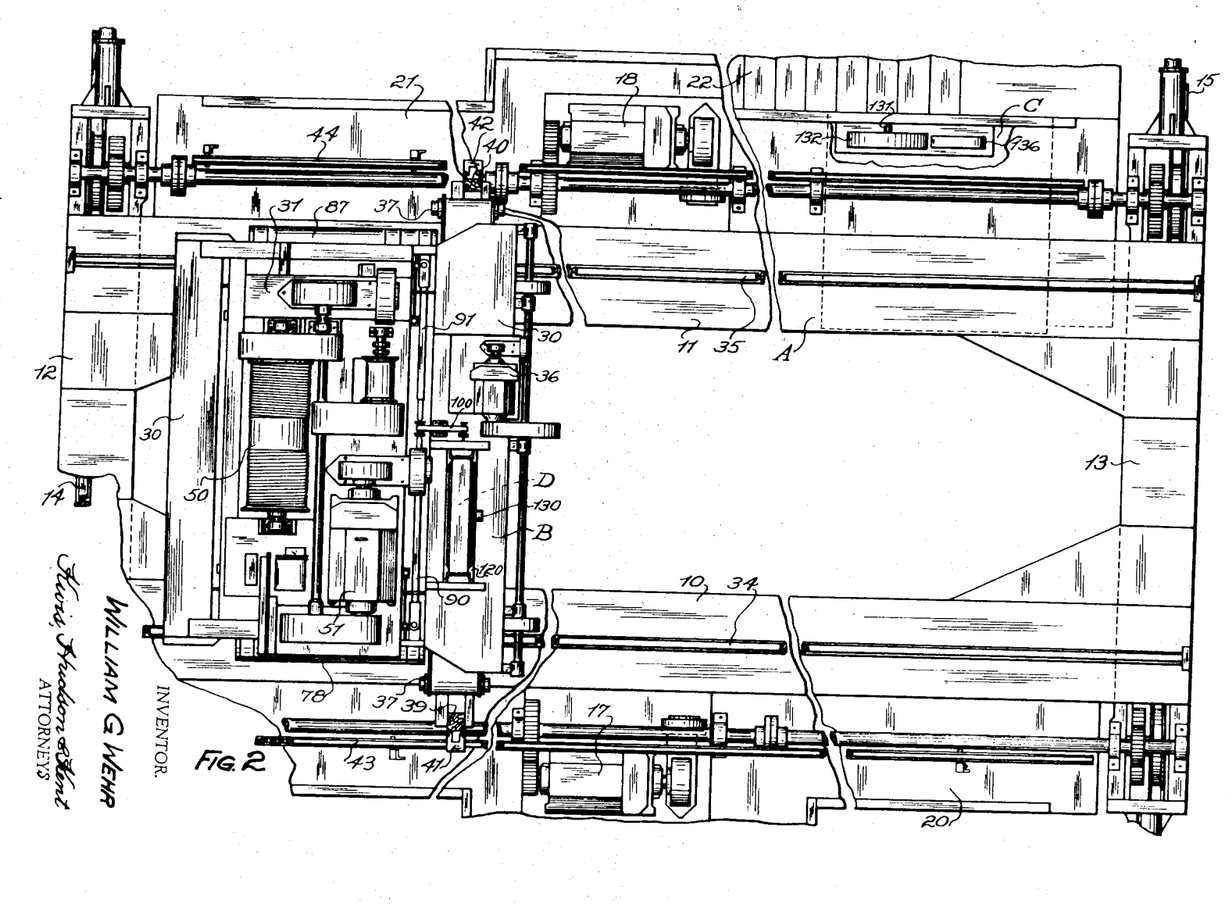
Fig. 2 is a plan view of the traveling crane shown in Fig. 1.
Figure 3:
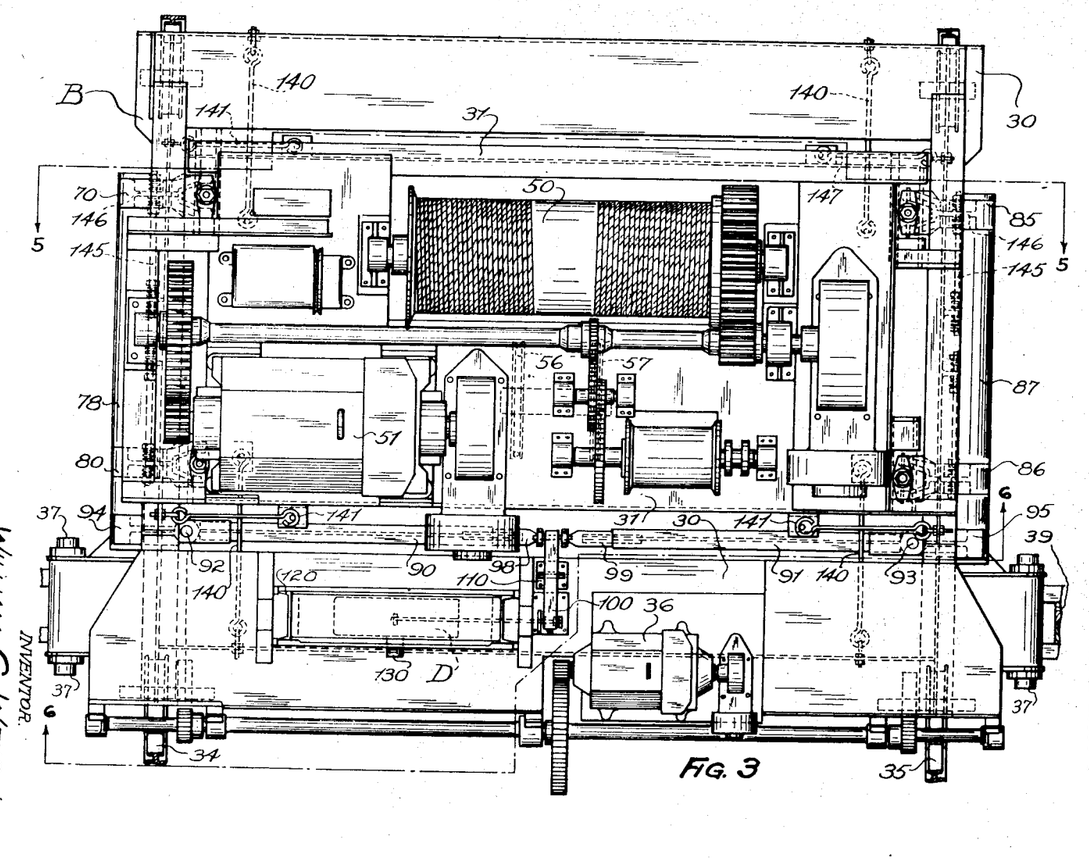
Fig. 3 is an enlarged plan view of the trolley.

Referring to the drawings, Fig. 1 shows a traveling crane comprising a bridge A, a trolley B supported on the bridge, and a control cage C suspended from the bridge. The bridge A illustrated comprises box-type welded girders 10 and 11 carried on end trucks 12 and 13, also of welded construction, adapted to travel along the rails 14 and 15 supported by a building construction in any well known manner. The bridge A is adapted to be moved along the rails 14 and 15 in either direction by reversible electric motors 17 and 18, hereinafter referred to as the bridge motors, provided with suitable brakes and means for controlling the same from the cage C in a conventional manner. Foot walks 20 and 21 are provided on opposite sides of the bridge and the foot walk 21 on the far side of the crane, as viewed in Fig. 1, is connected to the cage C by stairs 22.

The trolley B comprises an outside welded steel frame member, hereinafter called the trolley frame, designated in general by the reference character 30, and an inside frame member, also of welded construction, hereinafter called the hoist frame and designated generally by the reference character 31, yieldably supported in the trolley frame 30 by means comprising automatic weighing mechanism in a manner hereinafter referred to. The trolley frame 30 is supported on rails 34 and 35 secured to the top cover plates of the girders 10 and 11 respectively, and is adapted to be moved therealong in either direction by a reversible electric motor 36, generally referred to as the trolley motor, provided with a suitable brake and means for controlling the same from the cage C in the usual manner. The trolley frame 30 may be of any suitable construction and will not be described in detail, suffice it to say that it is of generally rectangular shape, provided with the spring bumpers 37 for limiting its travel along the bridge, and carries the brackets 39 and 40, made of wood or other suitable insulating material, which support the contact shoes 41 and 42 respectively through the medium of which the electric circuits on the trolley are completed to the conductor bars 43 and 44 respectively, carried by the bridge, and thence to the cage, etc., in a manner well known in the art.

The hoist mechanism carried by the hoist frame 31, per se, forms no part of the present invention and will not be described in detail. Suffice it to say that it comprises a cable drum 50 adapted to be rotated in either direction by a reversible electric motor 51 equipped with suitable brakes, etc., controlled from the cage C in the usual manner. The ends of the hoist cable 52 are connected to the drum 50 adjacent the ends thereof and the cable 52 winds up toward the center of the drum. From the drum 50 the cable passes around two sheaves in the bottom block 55, thence around two sheaves 56 and 57 carried by the hoist frame, with the loop at the center of the cable passing around a sheave 58 attached to the bottom block.

The hoist frame 31 is suspended in the opening in the trolley frame 30 by automatic weighing mechanism for both vertical and horizontal movement in all directions in the following manner. Longitudinal members 60 and 61 secured to one end of the hoist frame adjacent a corner thereof are pivotally connected to the lower end of a suspension bolt 62 through the medium of a convex or rocker washer 63 which engages the under side of a rectangular block 64 positioned between the members 60 and 61 and welded thereto. The upper end of the bolt 62 projects through a saddle block or member 68 pivotally supported by means of knife edge load pivots 69 in the forked end of a lever or head member 70. Adjusting nuts 71 and 72 threaded onto the bolt 62 above the saddle block 68 provide means for raising or lowering the hoist frame for purposes of adjustment etc. The lever 70 is pivotally supported or fulcrumed intermediate its ends by a knife edge fulcrum pivot 75 secured thereto which engages a member 76 attached to the upper edge of a member 77 rotatably supported in the trolley frame 30. The outer end of the head member or lever 70 is welded to a heavy shaft or pipe lever 78 carried thereby. The opposite corner of the same end of the hoist frame 31 is provided with longitudinal members similar to the members 60 and 61 connected to a lever or head member 80, similar to the lever 70, in the same manner in which the members 60 and 61 are connected to the lever 70. The lever 80 is likewise pivotally supported or fulcrumed by means of a knife edge fulcrum pivot on a member similar to the member 77 rotatably supported by the trolley frame, and the outer end thereof is welded to the shaft 78.

The other end of the hoist frame 31 is pivotally connected to the inner ends of head members or levers 85 and 86, similar to the levers 70 and 80 just described, in like manner. The levers 85 and 86 are pivotally supported or fulcrumed on the trolley frame 30 in a manner similar to the levers 70 and 80 through the medium of knife edges, etc., and are fixed to and carry a shaft 87 similar to the shaft or member 78. Splice arms or structural steel members 90 and 91 extending from opposite ends of the trolley to a point adjacent the center thereof are operatively connected to the shafts or pipe levers 78 and 87, respectively, by vertical hinge pin connections 92 and 93 and head members 94 and 95 welded to the ends of the shafts. The inner ends of the splice arms 90 and 91 which are provided with adjustable nose irons 98 and 99 are suspended by means of adjustable shackles from a transverse lever 100. The nose irons 98 and 99 are provided with knife edges which rest on members 101 and 102, respectively, suspended from members 103 and 104, respectively, by bolts 105 provided with adjusting nuts at the upper ends thereof. The members 103 and 104 are in turn pivotally supported on knife edge load pivots fixed in the load end of the lever 100, and placed at right angles to the knife edges carried by the nose irons.

The lever 100 is pivotally supported or fulcrumed intermediate its ends on a bracket 110 carried by the trolley frame 30 by means of a knife edge fulcrum pivot 112 secured thereto. The outer end of the lever 100 is operatively connected through the medium of knife edge pivots fixed thereto to a stirrup member 115 and in turn a link or rod 116 the lower end of which is connected to a lever 117 through the medium of a stirrup member 118 and knife edge pivots 119. The lever 117 is pivotally connected adjacent the knife edge pivots 119 to a projecting member on a rectangular frame 120 carried by the trolley frame 30 through the medium of link members 121 and 122 and knife edge pivots 123 carried by the lever 117. The long end of the lever 117 projects into a housing 129 of a conventional scale mechanism designated in general by the reference character D, where it is connected to the counterforce system, etc., through the medium of a steelyard 124 and links 125 and 126 in a conventional manner. The scale mechanism D is of conventional construction and, per se, forms no part of the present invention and will not be described in detail. Suffice it to say that the scale mechanism D illustrated is a Fairbanks automatic self-indicating dial scale comprising the conventional dial and pointer, and utilizing the double pendulum compensating mechanism 127 supported on the pendulum frame 128. In the present instance the dial and pointer are used only in checking the scales and could be dispensed with as will hereinafter appear.

Figures 4, 11:
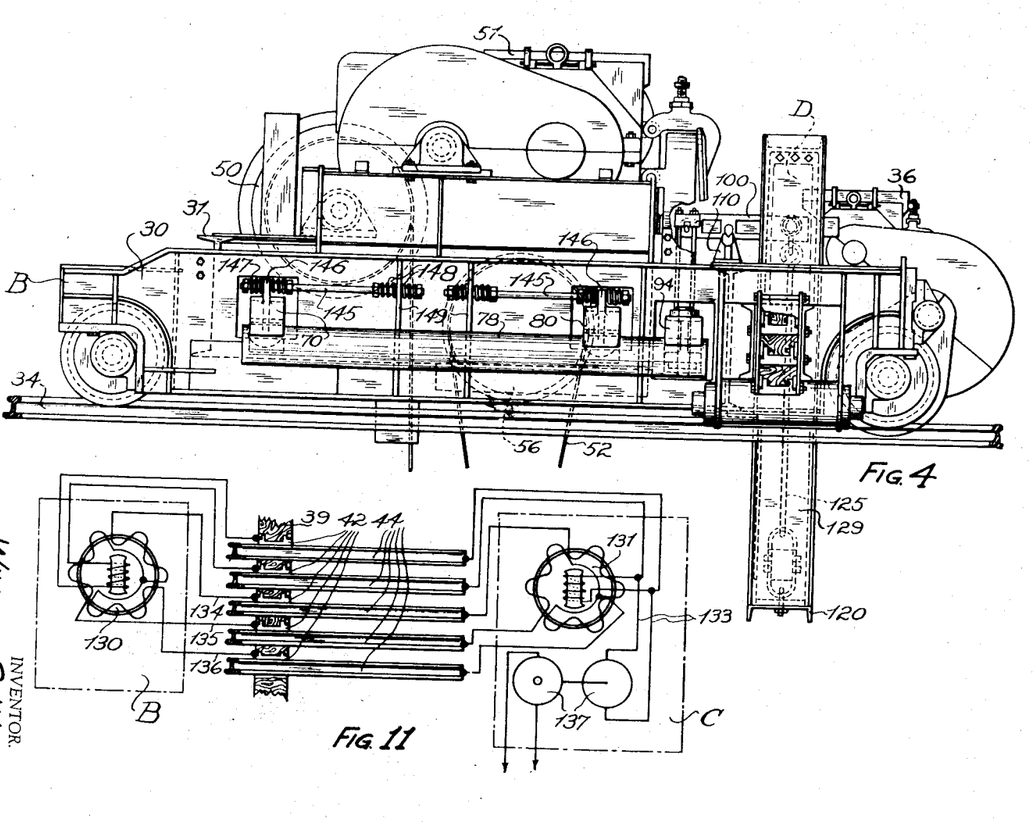
Fig. 4 is an enlarged elevation of the trolley as viewed in Fig. 1.
Fig. 11 is a diagrammatic wiring diagram of part of the electric equipment.
Figures 5, 7:
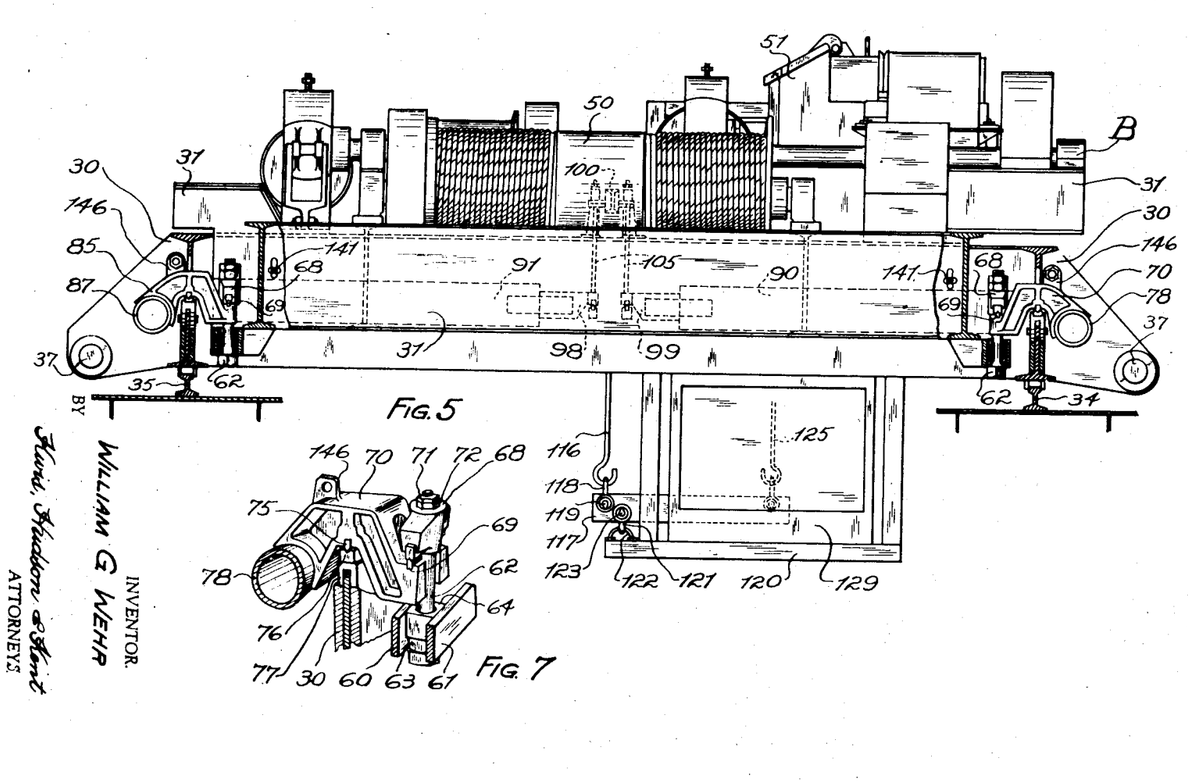
Fig. 5 is a section approximately on the line 5—5 of Fig. 3.
Fig. 7 is a perspective view of the corner suspension elements for the hoist frame.
Figures 6, 8:
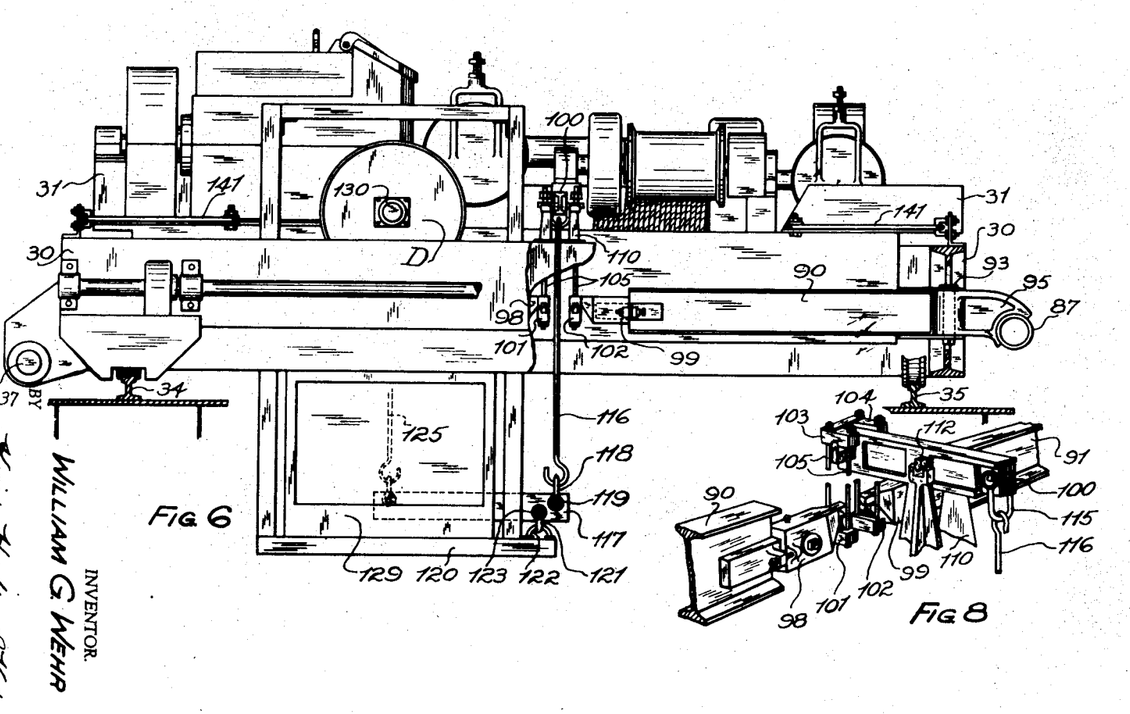
Fig. 6 is a section approximately on the line 6—6 of Fig. 3.
Fig. 8 is a perspective of the transverse lever connections.

The pointer shaft of the scale mechanism D is directly connected with a self-synchronous motor 130 of the type known commercially as Selsyn, a trade-name of the General Electric Company. The motor 130 forms the generator or transmitter of a self-synchronous system known commercially as a Selsyn system, the indicator motor 131 of which is connected to the pointer shaft of a mechanical recording dial device 132 located in the cage C. The motors 130 and 131 are similar to three-phase induction motors but have shuttle-wound rotors with definite poles, the windings of which are connected through collector rings to a single-phase alternating current source of excitation 133. The stator windings of the transmitter motor 130 are connected to those of the indicator motor 131 by the three circuits 134, 135 and 136, as shown in the wiring diagram. These circuits, together with the other necessary circuits, such as the single-phase alternating current circuit 133, are completed through the conductor bars 44 in the same manner in which the other control circuits are completed between the trolley B and the cage C.

When the rotor excitation circuit is closed, as is normally the case, an alternating current voltage is impressed on the rotors of both the transmitter 130 and the indicator 131. The single-phase current in the rotors induces voltages in the three legs of each stator which are unequal in magnitude and vary with the position of the rotor. When the two rotors are in exactly corresponding positions, the voltages induced in the transmitter stator are equal and opposite to those induced in the indicator stator, that is, they are balanced and no current flows in the windings of either stator. If, however, the rotor of the transmitter motor 130 is moved from the original position, the induced voltages are no longer equal and opposite, and current flows in the stator windings, setting up torques in both rotors. Since the rotor of the transmitter motor 130 is held in position and the rotor of the indicator motor 131 is free to turn, the rotor of the indicator motor is pulled around into the position in which the stator voltages balance, which position corresponds to the new position of the transmitter. Thus, as the rotor of the transmitter motor is turned, the rotor of the indicator motor follows at the same speed and in the same direction. In the present instance, direct current is supplied to the crane, as is the usual practice, and a small motor generator set 137 located in the cage C forms the source of single-phase alternating current.

Figure 10:
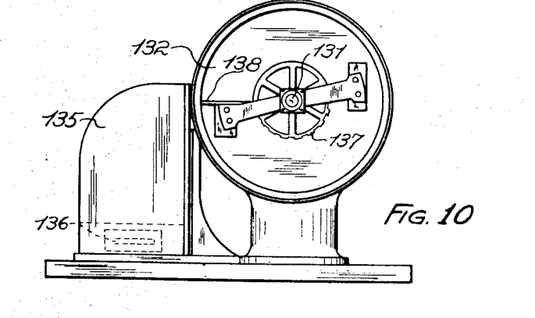
Fig. 10 is an elevation of the mechanical recording dial mechanism located in the cage with the cover removed.

The pointer shaft and pointer in the cage move in unison with the pointer shaft of the scale mechanism D on the trolley, and the weight of the load is read direct in the cage. The weight of the hoist frame 31 and the hoist mechanism carried thereby, including whatever grabs, etc., are employed, is compensated for in the scale mechanism D in a well known manner, preferably by means controlled from the cage C. In this event the pointer in the cage indicates the actual weight of the load suspended. The mechanical weight recording dial device 132 comprises an automatic weight recording mechanism 135 which prints a record either on a ticket inserted in the slot 136 or on a continuous strip, etc., as desired. The mechanical recording dial device shown is that of a commercial Fairbanks automatic weight recording scale with the counterforce system removed. The Weightomatic printer as it is known commercially is operatively connected to the pointer shaft of the mechanism through the medium of notched contact disks 137 attached to the indicator or pointer shaft. The type is set up for printing the weight indicated by the dial by means of the notched disks 137 which revolve with the indicator through bars 138 arranged to contact with the disks. The type bars are connected to the lower end of levers, the upper ends of which are connected to the bars 138.

The construction described permits free movement of the hoist frame in all directions without displacement of the pivots and bearings, and without producing torsional strain in the levers, etc. The movement of the hoist frame 31 within the trolley frame 30 in a horizontal plane is limited by a plurality of links 140 and 141 located at each corner of the trolley and pivotally connected to the frames 30 and 31 by lost motion connections in such a manner that they do not interfere with the free movement of the hoist frame in a vertical direction. The members 70, 80, 85, 86, etc., are centered on the knife edges, etc., and are retained in their correct positions against disturbances caused by sudden stopping and starting of the trolley, etc., by a plurality of rods 145 operatively connected to lugs 146 formed integral with the members 70, etc., and the trolley frame 30 through the medium of a plurality of compression springs 147 and 148 positioned at opposite ends of the rods. The springs 147 at one end of the rods 145 engage the lugs 146 therebetween and the springs 148 at the other end a flange 149 on the trolley frame.

Figure 9:
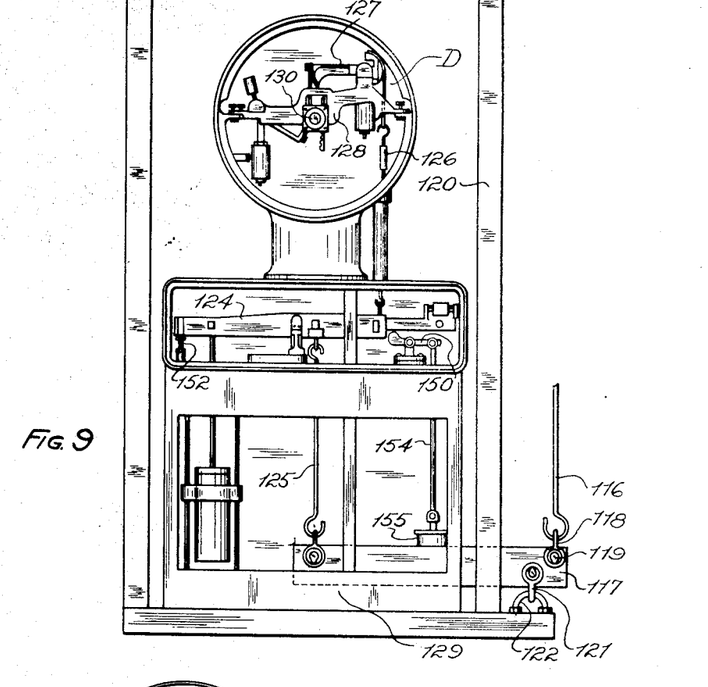
Fig. 9 is an elevation of the scale mechanism carried by the trolley, with the covers removed.

Provision is made for raising the lever 124 and locking the same in a stationary position during movement of the crane from one place to another, or when it is desired to operate the same without the weighing feature, etc., in the form of a lever 150 in the nature of a bell crank lever, one end of which is adapted to engage the underside of the lever 124 and raise the same when the lever 150 is rotated in a clockwise direction as viewed in Fig. 9. As the one end of lever 124 is raised by the lever 150 the other end thereof engages an adjustable stationary stop 152. The lever 150 may be operated in any convenient manner. As illustrated, it is operatively connected by a rod 154 to the armature of a solenoid 155 the operating circuit for which is controlled from the cage C in a well known manner.

From the foregoing description of the invention, it will be apparent that the objects thereof have been accomplished, that, among other things, a novel device has been provided for indicating and/or recording the weight of a load at a point remote from the scales proper, and a novel and improved crane of the traveling type has also been provided. While in the embodiment illustrated the dial and pointer or indicator intended to be read and the mechanical recording dial or Weightomatic printer are located in the cage, it will be understood that the same could be located at some place other than on the crane, such as on the floor of the building or in a room at some remote point, and such is within the contemplation of the present invention. The phrases "indicator device" and "indicating means" used in the claims cover any commercially known means for indicating and/or recording the weight of the load, irrespective of whether it gives a visual reading or printed record, etc.

The present invention resides in certain novel features and details of construction, and combinations and arrangements of parts, and this application is intended to cover all variations, adaptations, and uses thereof that come within the knowledge and customary practice of those skilled in the art to which it pertains, and I particularly point out and claim as my invention the following:

1. In an overhead traveling crane, the combination of: a crane bridge adapted to be supported on and traveled along a runway, a control cage suspended from said bridge, a trolley comprising a trolley frame supported on said bridge and movable therealong, a hoist frame, hoist mechanism including a cable drum and a hoist motor for rotating the latter carried by said hoist frame and adapted to lift the load, a lever pivotally supported by said trolley frame, means for operatively connecting said hoist frame to said lever, means for yieldably resisting the rotation of said lever about its pivotal support, a plurality of pairs of relatively rotatable and inductively related members adapted to be electrically connected to form an electromagnetic system wherein the relative angular movements between the members of a pair of said pairs of members are reproduced between the members of another pair of said pairs of members, one pair of said pairs of members being located on said trolley, another pair of said pairs of members being located at a place remote from said trolley, mechanical means for operatively connecting one member of said pair of members located on said trolley with said trolley frame and mechanical means for operatively connecting the other member of said pair of members located on said trolley with said hoist frame whereby the relative angular position between the members of said pair of members located on said trolley will be a function of the relative position of said hoist frame with respect to said trolley frame, a plurality of conductors fixedly supported on said bridge and extending longitudinally thereof, a plurality of collectors carried by said trolley and adapted to engage said conductors, means for electrically connecting said pair of members located on said trolley with said collectors, means for electrically connecting said pair of members remote from said trolley with said conductors, and load-indicating means controlled by the last mentioned pair of members adapted to indicate the weight of a load lifted by the hoist mechanism.

2. In an overhead traveling crane, the combination of: a crane bridge adapted to be supported on and traveled along a runway, a control cage suspended from said bridge, a trolley comprising a trolley frame supported on said bridge and movable therealong, a hoist frame, hoist mechanism including a cable drum and a hoist motor for rotating the same carried by said hoist frame and adapted to lift a load, means including automatic weighing mechanism for suspending said hoist frame in said trolley frame, a plurality of pairs of relatively rotatable and inductively related members adapted to be electrically connected to form an electromagnetic system wherein the relative angular movements between the members of a pair of said pairs of members are reproduced between the members of another pair of said pairs of members, one pair of said pairs of members being located on said trolley, another pair of said pairs of members being located at a place remote from said trolley, mechanical means for operatively connecting one member of said pair of members located on said trolley with said hoist frame and mechanical means for operatively connecting the other member of said pair of members located on said trolley with said trolley frame whereby the relative angular position between the members of said pair of members located on said trolley is a function of the relative position of said hoist frame with respect to said trolley frame, a plurality of conductors fixed on said bridge and extending longitudinally thereof, a plurality of collectors carried by said trolley and adapted to engage said conductors, means for electrically connecting said pair of members located on said trolley with said collectors, means for electrically connecting said pair of members remote from said trolley with said conductors, and load-indicating means controlled by the last mentioned pair of members adapted to indicate the weight of a load lifted by the hoist mechanism.

3. In an overhead traveling crane, the combination of: a crane bridge adapted to be supported on and traveled along a runway, a control cage suspended from said bridge, a trolley comprising a trolley frame supported on said bridge and movable therealong, a hoist frame, hoist mechanism including a cable drum and a hoist motor for rotating the latter carried by said hoist frame and adapted to lift a load, means including automatic weighing mechanism for suspending said hoist frame in said trolley frame, said automatic weighing mechanism including a rotatable spindle the angular position of which is a function of the weight of a load suspended from the hoist mechanism, a plurality of pairs of relatively rotatable and inductively related members adapted to be electrically connected to form an electromagnetic system wherein the relative angular movements between the members of a pair of said pairs of members are reproduced between the members of another pair of said pairs of members, one pair of said pairs of members being located on said trolley, another pair of said pairs of members being located at a place remote from said trolley, means for fixedly connecting one member of said pair of members located on said trolley to said trolley frame, means for operatively connecting the other member of said pair of members located on said trolley to said spindle whereby rotation of said spindle will be imparted to said member, a plurality of conductors fixed on said bridge and extending longitudinally thereof, a plurality of collectors carried by said trolley and adapted to engage said conductors, means for electrically connecting said pair of members located on said trolley with said collectors, means for electrically connecting said pair of members remote from said trolley with said conductors, and load-indicating means controlled by the last mentioned pair of members adapted to indicate the weight of a load lifted by the hoist mechanism.

4. In an overhead traveling crane, the combination of: a crane bridge adapted to be supported on and traveled along a runway, a control cage suspended from one end of said bridge, a trolley comprising a trolley frame supported on said bridge and movable therealong, a hoist frame, hoist mechanism including a cable drum and a hoist motor for rotating the latter carried by said hoist frame and adapted to lift a load, means including automatic weighing mechanism for suspending said hoist frame in said trolley frame, a plurality of pairs of relatively rotatable and inductively related members adapted to be electrically connected to form an electromagnetic system wherein the relative angular movements between the members of a pair of said members are reproduced between the members of another pair of said pairs of members, one pair of said pairs of members being located on said trolley, another pair of said pairs of members being located in said control cage, mechanical means for operatively connecting one member of said pair of members located on said trolley with said hoist frame and mechanical means for operatively connecting the other member of said pair of members located on said trolley with said trolley frame whereby the relative angular position between the members of said pair of members located on said trolley is a function of the angular position of said hoist frame with respect to said trolley frame, a plurality of conductors fixed to said bridge and extending longitudinally thereof, a plurality of collectors carried by said trolley and adapted to engage said conductors, means for electrically connecting said pair of members located on said trolley with said collectors, means for electrically connecting said pair of members located in said control cage with said conductors, and load-indicating means controlled by said pair of members located in said control cage adapted to indicate the weight of a load lifted by the hoist mechanism.

WILLIAM G. WEHR.